US012708957B2

(12) United States Patent
Ma et al.

(10) Patent No.: US 12,708,957 B2
(45) Date of Patent: Aug. 18, 2026

(54) SYSTEM AND METHOD FOR ALIGNING LASER BEAM WITH FILLER WIRE FOR LASER JOINING

(71) Applicant: GM GLOBAL TECHNOLOGY OPERATIONS LLC, Detroit, MI (US)

(72) Inventors: Junjie Ma, Novi, MI (US); John Forrest, Ann Arbor, MI (US); William A Keller, Rochester Hills, MI (US); Baixuan Yang, Canton, MI (US); Michael G Poss, Rochester Hills, MI (US); Blair E Carlson, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 982 days.

(21) Appl. No.: 18/045,585

(22) Filed: Oct. 11, 2022

(65) Prior Publication Data

US 2024/0116133 A1 Apr. 11, 2024

(51) Int. Cl.

*B23K 26/042* (2014.01)
*B23K 26/064* (2014.01)
*B23K 26/211* (2014.01)
*B23K 26/70* (2014.01)

(52) U.S. Cl.

CPC ........ *B23K 26/042* (2015.10); *B23K 26/0648* (2013.01); *B23K 26/211* (2015.10); *B23K 26/705* (2015.10)

(58) Field of Classification Search

CPC .. B23K 26/042; B26K 26/211; B26K 26/705; B26K 26/0648

USPC .................................................... 219/121.78

See application file for complete search history.

(56) References Cited

U.S. PATENT DOCUMENTS 11,465,236 B2 * 10/2022 Forrest ............... B23K 26/0884
2005/0247681 A1 * 11/2005 Boillot ................ B23K 26/044 219/121.63
2018/0089824 A1 3/2018 Bevan
2018/0328725 A1 11/2018 Borgstrom et al.

FOREIGN PATENT DOCUMENTS

CN 109530918 A 3/2019
CN 110545947 A 12/2019
CN 212264884 U 1/2021

(Continued)

OTHER PUBLICATIONS

English Translation of JP 4127614 B2 (Year: 2008).*
English Translation of JP_4341172_B2 (Year: 2009).*

*Primary Examiner* — Topaz L. Elliott
*Assistant Examiner* — Solan Oliva
(74) *Attorney, Agent, or Firm* — Ingrassia Fisher & Lorenz, LLP | IF&L

(57) ABSTRACT

Systems and methods determine alignment between a wire and a laser beam in laser joining. A system for checking alignment of a wire relative to a beam of a laser includes a controller configured to align, by tooling, the beam with a sensor system. A laser generates the beam across the wire, with the beam directed to the sensor system. The sensor system measures light intensity of the beam. A processor computes a feature parameter representative of an alignment between the wire and the beam. The processor determines whether the feature parameter is within the process specifications.

20 Claims, 7 Drawing Sheets

(56) References Cited

FOREIGN PATENT DOCUMENTS

| | | | | |
|---|---|---|---|---|
| DE | 102017010108 | A1 | | 5/2019 |
| JP | H06344163 | A | | 12/1994 |
| JP | 4127614 | B2 | * | 7/2008 |
| JP | 4341172 | B2 | * | 10/2009 |

* cited by examiner

SYSTEM AND METHOD FOR ALIGNING LASER BEAM WITH FILLER WIRE FOR LASER JOINING

INTRODUCTION

The present disclosure generally relates to automated joining with wire laser systems, and more particularly relates to systems and methods for aligning a filler wire with a laser beam by sensing light from the pilot laser beam when directed across the wire and using a feature parameter that quantizes the alignment state.

Laser joining, which includes processes such as laser welding and laser brazing, may use a supply of filler material to join parts. For example, a wire material may be supplied to the area being joined for filler as the laser applies heat to effect fusion. A wire feed system may be employed that unwinds the wire, such as from a reel, and that directs the wire to a location within the laser's beam. The wire may be fed through a wire guide that directs the wire to the desired location to form the joint.

As noted, laser joining may include laser brazing and laser welding of workpieces. In laser brazing only the wire and not the base material of the workpieces is melted. In laser welding the wire and the base material of the workpieces is melted together. The brazing, welding and other possible laser joining methods are collectively referred to as joining.

In laser joining, the position of the wire relative to the applied energy of the laser beam is desirably maintained in a consistent relationship. When the alignment of the wire and the beam changes, the quality of the joint that is produced diminishes. Therefore, maintaining alignment is beneficial.

Accordingly, it is desirable to provide systems and methods that efficiently, accurately and repeatably produce alignment between the laser beam and the wire. In addition, the flexibility to apply the systems to a wide variety of joining operations is desirable. Furthermore, other desirable features and characteristics of the present invention will become apparent from the subsequent detailed description and the appended claims, taken in conjunction with the accompanying drawings and the foregoing introduction.

SUMMARY

Systems and methods are provided for maintaining alignment between a laser beam and a wire for laser joining. In a number of embodiments, a system for checking alignment of a wire relative to a beam of a laser includes a controller configured to align, by tooling, the beam with a sensor system. A laser, which may be a pilot laser, generates the beam, which may be a pilot beam, across the wire, with the beam directed to the sensor system. The sensor system measures light intensity of the beam. A processor computes a feature parameter representative of an alignment between the wire and the beam. The processor determines whether the feature parameter is within the process specifications.

In additional embodiments, when the feature parameter is not within the process specifications, the controller is configured to adjust, by an actuator, alignment between the wire and the beam.

In additional embodiments, prior to computing the feature parameter, the controller is configured to compute, by the processor, a first area of the beam on a first side of the wire and a second are of the beam on a second side of the wire.

In additional embodiments, the feature parameter uses the first area and the second area to indicate relative alignment of the wire to the beam.

In additional embodiments, the feature parameter is computed using $$\lambda = 100 \times \frac{S_r - S_l}{S_r + S_l},$$

where λ is the feature parameter, $S_l$ is the first area, and $S_r$ is the second area.

In additional embodiments, a filter is disposed between the laser and the sensor system. The filter is configured to filter background light while allowing the beam to pass to the sensor system.

In additional embodiments, the sensor system includes an optical lens. The beam is aligned with the lens by the tooling to calibrate the image.

In additional embodiments, the sensor system includes a camera that is configured to generate pixel data representing light intensities of the beam and of a shadow cast by the wire.

In additional embodiments, the controller is configured to generate the beam in a low-energy mode when the beam is directed to the sensor system.

In additional embodiments, the controller is configured to determine, when the process specifications include centering the wire in the beam, whether the feature parameter is approximately zero.

In a number of other embodiments, a method for checking alignment of a wire relative to a beam of a laser includes aligning, by tooling operated by a controller, the beam with a sensor system. A laser operated by the controller generates the beam across the wire and directed to the sensor system. The sensor system measures light intensity of the beam. A processor computes a feature parameter representative of an alignment between the wire and the beam. The processor determines whether the feature parameter is within process specifications.

In additional embodiments, when the feature parameter is not within the process specifications, a method includes adjusting, by an actuator operated by the controller, alignment between the wire and the beam.

In additional embodiments, prior to computing the feature parameter, the processor computes a first area of the beam on a first side of the wire and a second are of the beam on a second side of the wire.

In additional embodiments, the feature parameter is computed by the processor using the first area and the second area to indicate relative alignment of the wire to the beam.

In additional embodiments, the feature parameter is computed using $$\lambda = 100 \times \frac{S_r - S_l}{S_r + S_l},$$

where λ is the feature parameter, $S_l$ is the first area, and $S_r$ is the second area.

In additional embodiments, a filter is positioned to be disposed between the laser and the sensor system. The filter filters background light while allowing the beam to pass to the sensor system.

In additional embodiments, an optical lens is included in the sensor system and the tooling aligns the beam to calibrate the image.

In additional embodiments, a camera of the sensor system generates pixel data. The pixel data represents light intensities of the beam and of a shadow cast by the wire.

In additional embodiments, when the process specifications include centering the wire in the beam, the method includes determining whether the feature parameter is approximately zero.

In a number of additional embodiments, a system for checking alignment of a wire relative to a beam of a laser includes a controller configured to align, by tooling, the beam with a sensor system. A laser generates the beam to pass across the wire and to be directed to the sensor system. The sensor system measures light intensity of the beam. A processor computes a first area of the beam on a first side of the beam, and a second area of the beam on a second side of the beam. The processor computes a feature parameter representative of an alignment between the wire and the beam. The processor determines whether the feature parameter is within process specifications. When the feature parameter is not within the process specifications, an actuator is operated to align the beam with the wire.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of steering systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
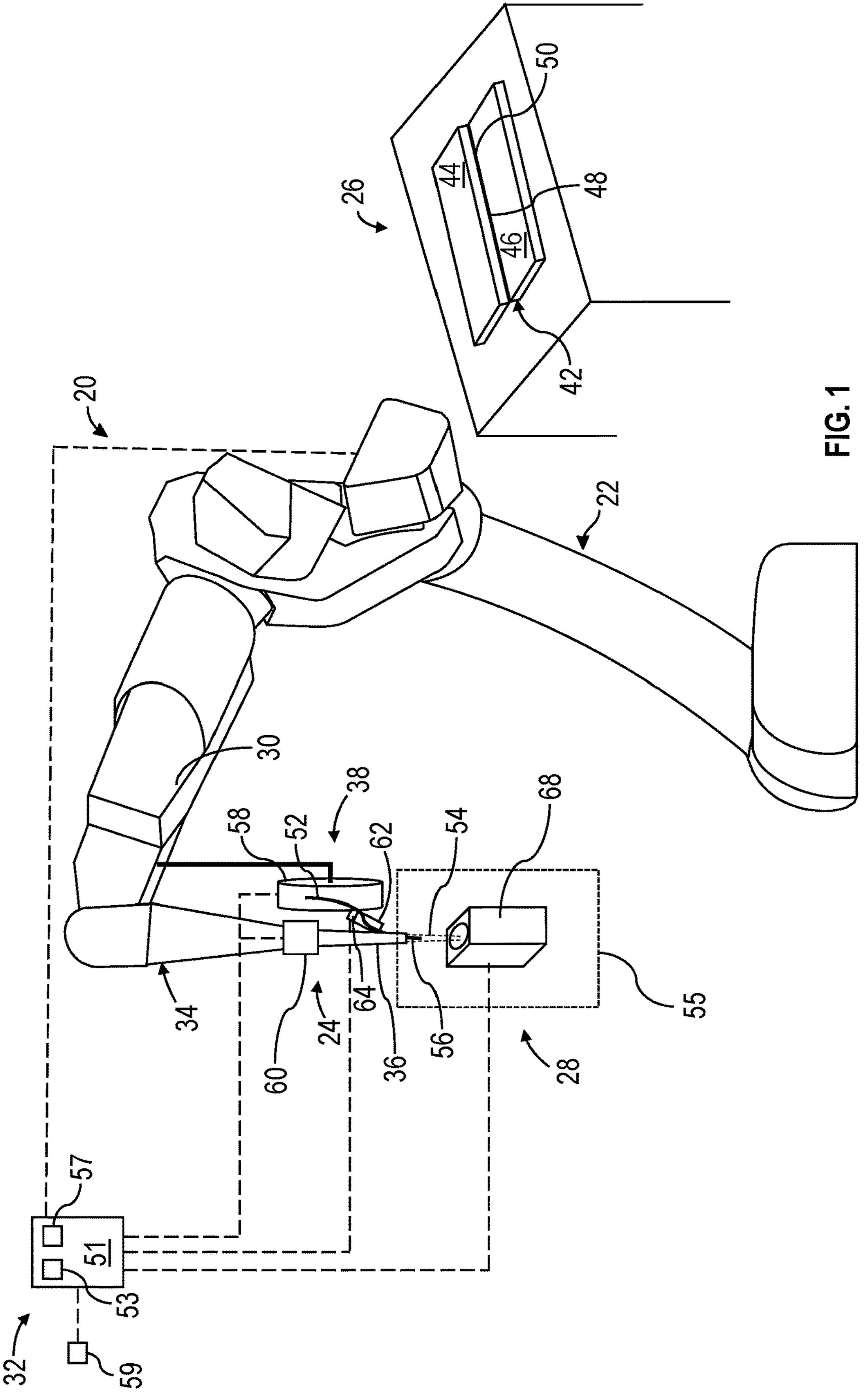
FIG. 1 is a schematic, perspective illustration of a robotic system for laser joining with a laser beam and filler wire alignment tool, in accordance with various embodiments.

Referring to FIG. 1, illustrated is a system 20, which is a manufacturing system that in general, includes a robot 22, with a laser joining system 24, a workstation 26, and an alignment check system 28. The robot 22 may be autonomous, or may be a collaborative robot designed to work alongside humans in a manufacturing environment. In general, the robot 22 includes a number of linked together and moveable structural elements including a robot arm 30, and includes a control system 32 with a number of actuators and sensors for use when moving the robot arm 30 through three-dimensional space. The robot arm 30 may have a multi joint structure so as to rotate about a plurality of axes The robot arm 30 is equipped with end-of-arm tooling 34 that includes at least parts of the laser joining system 24. In general, the laser joining system 24 includes a laser system 36, and a wire feed system 38, and works in cooperation with a workstation 26. The laser joining system 24 is also coupled with the control system 32, and with a number of actuators and sensors for operating on a workpiece 42. The wire feed system 38 and the alignment check system 28 are also coupled with the control system 32.

As illustrated, the workstation 26 is configured for joining a pair of components 44, 46 that collectively comprise the workpiece 42. In the current embodiment, the components 44, 46 are mating sheet metal panels that define a seam 48 that is welded by the laser joining system 24 to form a joint 50. The robot 22 moves to the workstation 26 and as the wire feed system 38 feeds a wire 52 into the seam 48, the laser system 36 applies a high-energy light beam to the wire 52 and to the seam 48 to melt the wire 52 and the adjoining material of the components 44, 46 to fuse the components 44, 46 together. In other embodiments, the workpiece 40 may comprise a singular part or multiple parts. The joining process may comprise welding, brazing (where only the wire 52 is melted) or another process that uses an energy source, such as the laser system 36 and a filler, such as the wire 52 that are aligned.

The wire feed system 38 may be installed on the robot arm 30 and/or end-of-arm tooling 34 and supplies the wire 52 into the beam 54 of the laser system 36. During processing of the workpiece 42, the wire feed system 38 feeds the wire 52 so that the end piece 56 of the wire 52 contacts the seam 48. A wire feeder 58 adjusts the supply speed of the wire 52 relative to the moving speed of the robot arm 30/end-of-arm tooling 34 and relative to the energy density of the laser system 36. The relative position of the wire 52 and the beam 54 is calibrated during setup and fixed for processing. However, the relative positions may move over time. Accordingly, the systems and methods described herein provide for checking and correcting the alignment.

The laser system 36 is configured to adjust/tune the direction of the beam 54 by an actuator suite 60, controlled by the control system 32 For example, a reflection plate or a lens (not shown) may be moveable by the actuator suite 60 to adjust the direction of the beam 54 and/or to focus the beam 54. In addition, the intensity of the beam 54 may be adjustable by the actuator suite 60. For example, the beam 54 may be generated in a high-energy state for processing the workpiece 42 and in a low-energy state for setup. The low-energy state may be referred to as a pilot state of the beam 54. The beam 54 may be a pilot laser beam used to indicate the position of the high-energy state welding/brazing laser beam. In embodiments, the beam 54 may be named a guide laser or an aiming laser. The pilot laser beam 54 may not have the same laser source as the welding/brazing laser but may share the same beam delivery fiber and optics as the welding/brazing beam, so the pilot laser beam is used to show the welding/brazing beam location.

The wire feed system 38 includes a wire guide 62 that directs the wire 52 to present the end piece 56 at a desired location relative to the beam 54. For example, the wire guide 62 may comprise a tube, nozzle, catheter, passage and/or channel through which the wire 52 is directed. In embodiments, the wire guide 62 may be positioned during setup of the system 20. In some embodiments, the wire guide 62 may include an actuator 64 controlled by the control system 32 for automated adjustments.

The alignment check system 28 includes a sensor system 68 configured to detect light for determining the relative position of the wire 52 and the beam 54. The robot 22 moves the end-of-arm tooling 34 to an alignment check cell 55 of the alignment check system 28 to determine whether the wire 52 and the beam 54 are properly aligned. The sensor system 68 is coupled with the control system 32 for control and for processing of collected data.

The control system 32 includes a controller 51, which may include a processor 53, a memory device 57, and may include or be coupled with a storage device 59. While one controller 51 is shown coupled with system 20 including the robot 22, with the end-of-arm tooling 34, with the laser joining system 24, with the wire feed system 38, and with the alignment check system 28, in one control system 32, any number of controllers may be used and may operate alone or in coordination to carry out the various functions. Accordingly, while the components of the control system 32 are depicted as being part of the same system (control system 32), it will be appreciated that in certain embodiments, these features may comprise multiple systems and any number of individual controllers may be employed.

The controller 51 may carry out instructions, when executed by the processor 53, support the receipt and processing of signals such as from the various sensors, and the performance of logic, calculations, methods and/or algorithms for automatically controlling the components and systems described herein, such as various actuators of the system 20. During operation, the processor 53 may execute one or more programs and may use data, each of which may be accessed from the storage device 59 and as such, the processor 53 controls the general operation of the controller 51 in executing the processes described herein, such as the processes described further below in connection with FIG. 11. The memory device 57 may store the above-referenced programs along with one or more stored values of the data such as for short-term data access. The storage device 59 stores data, such as for long-term data access for use in automatically controlling the system 20.

Figure 2:
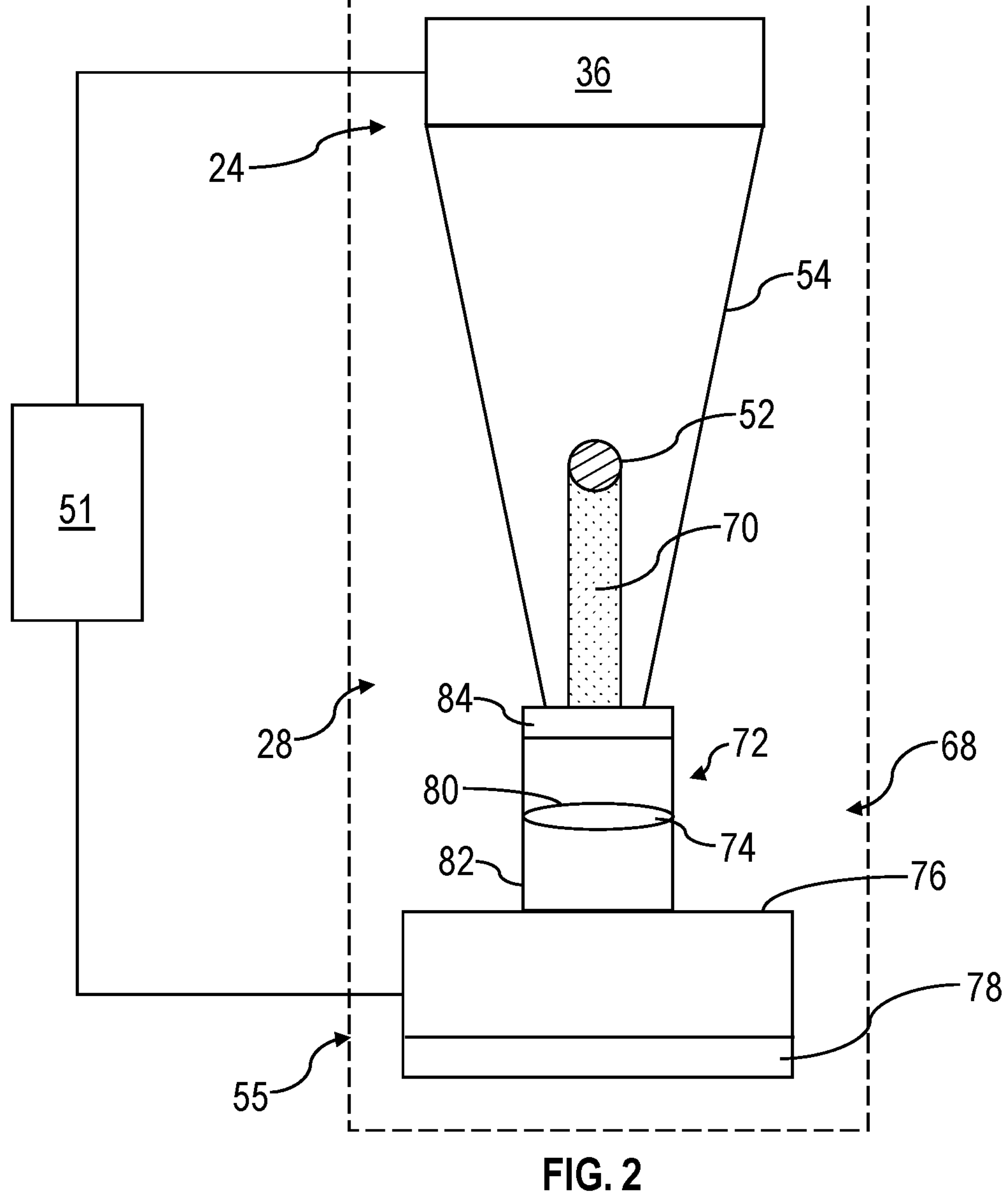
FIG. 2 is a schematic illustration of a part of the alignment tool of FIG. 1, in accordance with various embodiments.

Referring to FIG. 2, aspects of the laser system 36 positioned at the alignment check cell 55 are schematically illustrated. The laser system 36 is positioned to direct the beam 54 at the sensor system 68. For purposes of the alignment check, the beam 54 is generated in its low-energy (pilot) state. The laser joining system 24 is set up so that the wire 52 is presented in the path of the beam 54. The wire 52 produces a shadow 70 that is cast in the direction of the sensor system 68. In this embodiment, the sensor system 68 includes a camera 72 that has a lens 74 and a body 76 containing a light detector 78. The camera 72 may include its own processor to capture image data in a specified form and for communication to the controller 51. In other embodiments, another type of light detector may be used such as a light density meter, photo diode array, or other sensor that detects light. For example, with a photo diode array, those diodes exposed to the beam 54 may turn "on" and those in the shadow 70 remain "off" to indicate the areas illuminated.

The lens 74 may be an optical lens with a focal length suitable for focusing the incoming beam 54 on the light detector 78. The beam 54, in its pilot state (pilot beam), is directly vertical radiated on the lens 74. In other words, the beam 54 is directed normal to the front surface 80 of the lens 74, and normal to the focal axis. This positioning avoids image distortion and enables using a single camera/lens leading to minimized processing time. The lens 74 may be contained in an extension 82 of the body 76 of the camera 72. Aligning the beam 54 normal to the optical lens 74 provides an efficient way to ensure the image is calibrated. In other embodiments, the beam 54 may not be normal to the lens 74, and two cameras may be used so that the image may be calibrated. In other embodiments where the beam 54 is not normal, the angle between the beam 54 and lens 74 may be measured to calibrate the image.

The beam 54 in the pilot state, may still be more powerful than required for alignment checking. Accordingly, the beam 54 is directed through a light filter 84 prior to reaching the lens 74. The laser light of the pilot beam 54 may be emitted by the laser system 36 in a narrow wavelength band determined by the type of laser employed. The welding/brazing laser may be a Ytteribum-fiber laser, the wavelength may be at or approximately 1064 nanometers and with a carbon dioxide laser the wavelength may be at or approximately 10600 nanometers. The pilot laser may produce a beam 54 that is visible, for example, with a wavelength of around 650 nanometers. In other embodiments, another wavelength may be used. The light filter 84 is constructed as a laser bandpass filter to pass a restricted wavelength spectrum to the lens 84 and to reduce the power of the beam 54. The light filter 84 transmits only the wavelengths that correspond to the type of laser in use and filters other wavelengths. For example, background/ambient light is filtered from reaching the sensor system 68 to not interfere with detecting only the light of the beam 54 at its respective wavelength, while the 650 nanometer light passes through. In embodiments, the light filter 84 may be constructed with an optical density to attenuate the light that passes through to the lens 74, such as a high optical density to reduce the power of the pilot beam 54 from its pilot state to a checking state of lower energy/power in the alternative to a band pass or in addition thereto.

Because of the light characteristics, a monochromatic sensor system may be used to detect the beam 54. The light detector 78 may be any of a variety of suitable devices. Two examples are a charge-coupled device (CCD), and a complementary metal oxide semiconductor (CMOS) image sensor. The incoming beam 54 as directed through the lens 74 is distributed/sensed as pixels. The light detector 78 measures the intensity of each pixel represented as pixel data. The pixel data contains a series of numbers which describe the respective measured light intensity across the area of the light detector 78 at each pixel location. The light information that is captured as digital information in the pixel data is stored in the memory.

Figure 3:
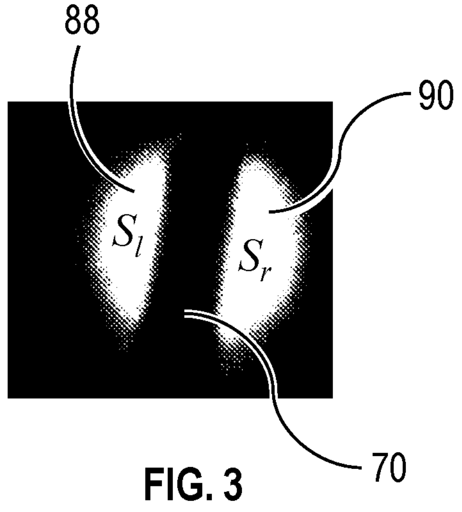
FIG. 3 is a schematic view of an image captured by the alignment tool of FIG. 1, in accordance with various embodiments.

The digital information may be stored as the pixel data in the storage device 59 of the control system 32. The pixel data may be used to produce or represent the image sensed by the sensor system 68. The pixel data does not require further converting to digital information leading to fast processing of the information about the light detected. Referring to FIG. 3, an image 86 of the detected light is shown. The light from the beam is split into two parts designated as a left area 88 ($S_l$), and a right area 90 ($S_r$). While a left area 88 and a right area 90 are described for a point of reference, left and right are only selected for convenience, and there are simply two areas, which may be referred to as two areas or as a first area and a second area. The left area 88 and the right area 90 are separated by a dark area 92 resulting from the shadow 70 of the wire 52. The area around the outside of the beam is also dark, which may result from the spot size of the laser's beam 54. Parameters of the left area 88 and of the right area 90 may be used for determining whether the beam 54 is aligned with the wire 52 according to the specifications for the joining process. For example, comparing the left area 88 to the right area 90 may be used to evaluate the beam 54 and the wire 52 alignment.

Figure 4:
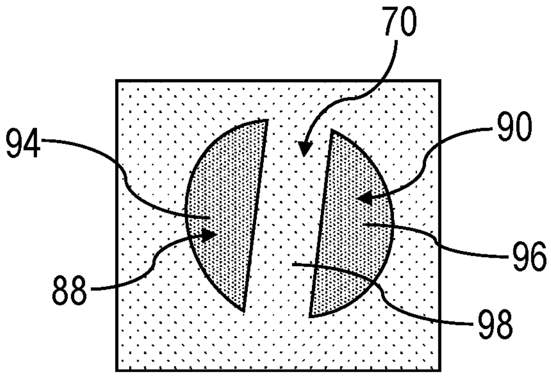
FIG. 4 is a schematic view of areas produced from the image of FIG. 3, in accordance with various embodiments.

Referring to FIG. 4, the pixel data is depicted for the light reaching the light detector 78. The pixels 94 in the left area 88 register light at a generally consistent intensity level ($I_l$), the pixels 96 in the right area 90 register light at a generally consistent intensity level ($I_r$), and the pixels 98 in the shadow 70 register light at an intensity level ($I_s$) the intensity level $I_s$ may vary over the area of the shadow 70 depending on distance from the left area 88 and the right area 90. $I_r$ is generally in the same level as $I_l$, $I_r$ and $I_l$ are at a substantially higher level than $I_s$, which enables discerning the boundaries of $I_l$ and $I_r$ and enables discerning the location of the shadow represented by $I_s$, which correlates to the location of the wire 52 relative to the beam 54.

In evaluating the location of the wire 52 relative to the beam 54, a feature parameter (λ) has been developed as part of the current disclosure. The feature parameter provides a mechanism for representing relative position of the wire 52 in the beam 54 and is a quantized value for the relative position. The feature parameter is represented by the relationship:

$$\lambda = 100 \times \frac{S_r - S_l}{S_r + S_l}.$$

The feature parameter λ represents the position of the wire 52 relative to the beam 54.

Figure 5:
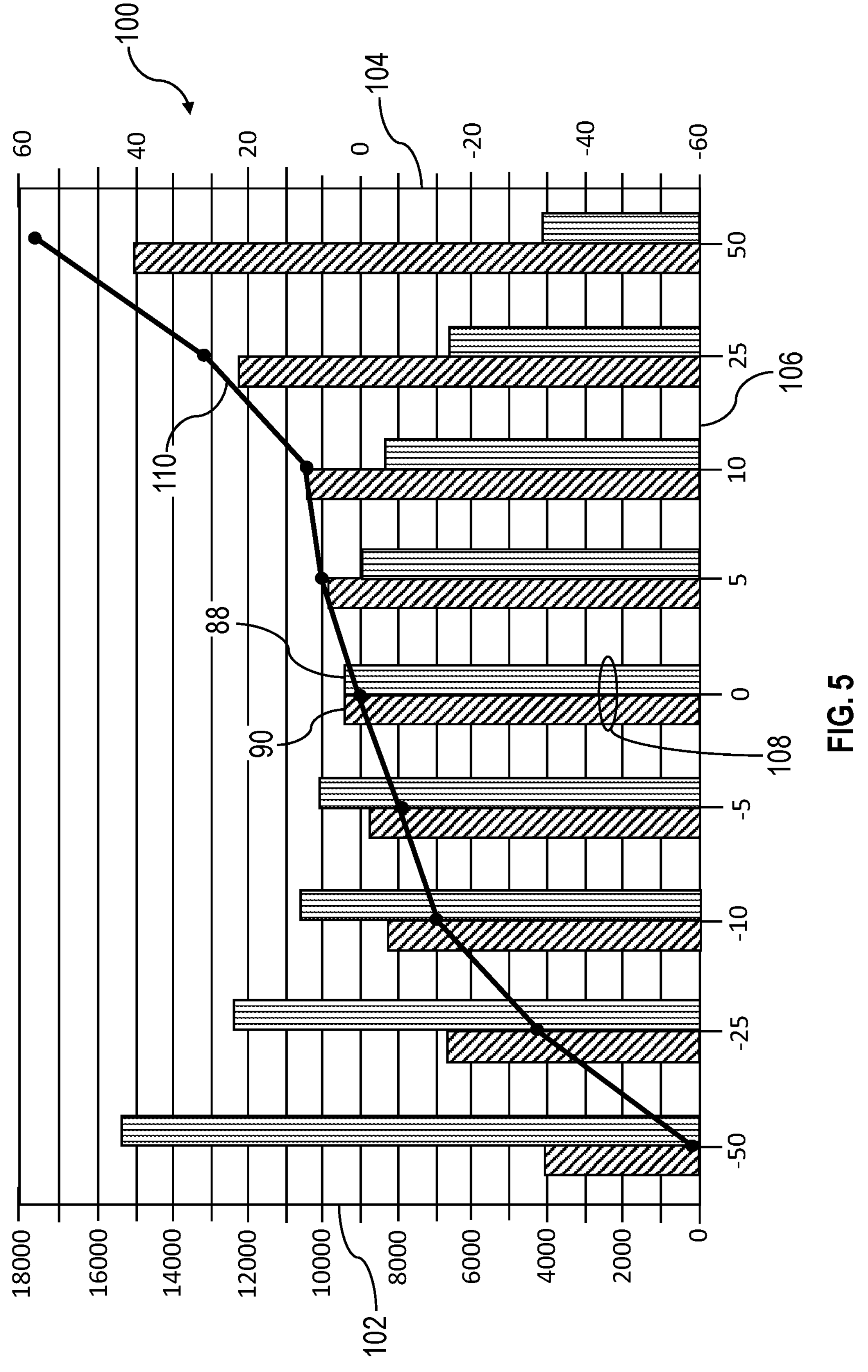
FIG. 5 is a graph of pixels and feature parameter on the vertical axes versus beam position with respect to the wire on the horizontal axis, in accordance with various embodiments.

Referring to FIG. 5, the relationships between alignment, pixels and feature parameters are graphically illustrated. The graph 100 depicts number of pixels on the left vertical axis 102, feature parameter on the right vertical axis 104, and wire 52 alignment with respect to the beam on the horizontal axis 106 indicated by values of 0.01 millimeters from center (e.g., "5" means 0.05 mm left of center). Each pair of bars on the graph 100 (e.g., pair 108), represents the numbers of pixels in the left area 88 and the right area 90, separately. The curve 110 represents the feature parameter λ computed for the left area 88 and the right area 90 at various intervals separated by five units for demonstration purposes. When the numbers of pixels in the left area 88 and the right area 90 is equal (at around 9500 pixels each on the axis 102) for the bar pair 108, the bars are the same height. For the bar pair 108, the value on the horizontal axis 106 is zero meaning a centered wire 52. For the bar pair 108, the feature parameter λ is zero, meaning the left area 88 is equal to the right area 90. This means the wire 52 is aligned with the beam 54 in a centered position. For the far left bar pair in the graph 100, $S_l$ is approximately 4000 pixels and $S_r$ is approximately 15500 pixels. This corresponds to a feature parameter indicated on the axis 104 of −60 and an offset from beam center of −0.50 millimeters (50 mm right of center) as indicated on the axis 106. In sum, the graph 100 demonstrates the relationship between the feature parameter λ and wire-to-beam alignment.

Figure 6:
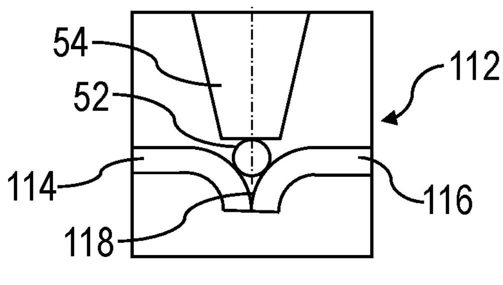
FIG. 6 is a schematic illustration of a workpiece joining example using the robotic system of FIG. 1 with zero offset, in accordance with various embodiments.
Figure 7:
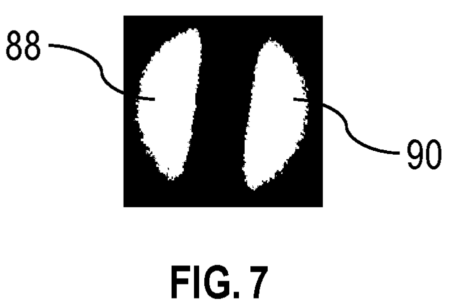
FIG. 7 is a schematic view of a sensed image of the example of FIG. 6 using the alignment tool of FIG. 1, in accordance with various embodiments.

Referring to FIG. 6, an example of a joining process 112 with a centered wire 52 is schematically illustrated. The joining process 112 includes joining two panels 114 and 116, which may be made of sheet metal. The panels 114 and 116 each have bend or hem presenting a seam 118. The panels 114 and 116 are mirror images of each other in the area being joined and present a straight even seam 118. In this embodiment, the specifications of the joining process 112 call for alignment of the beam 54 and the wire 52 with the wire 52 centered in the beam 54. FIG. 7 illustrates the desired image 120 from the alignment check system 28 with the left area 88 equal to the right area 90. For the left area 88 to equal the right area 90, the numbers of pixels in each area that indicate significant light should be equal and the sizes of the area should be equal.

The specifications for the joining process 112 may include tolerances to allow for some variation between the left area 88 and the right area 90. For example, a feature parameter within the tolerance range of −2.0 to +2.0 may be acceptable. A representative alignment check may result in 10322 pixels in the left area 88 and 10122 pixels in the right area 90 indicating illumination. This correlates to a feature parameter of −0.98, which is within the tolerance range of −2.0 to +2.0 indicating acceptable alignment of the beam 54 and the wire 52, with no adjustment necessary. Another representative alignment check may result in 10808 pixels in the left area 88 and 9508 pixels in the right area 90 indicating illumination. This correlates to a feature parameter of −6.40, which is outside the tolerance range of −2.0 to +2.0 indicating unacceptable alignment of the beam 54 and the wire 52, with adjustment being necessary.

Figure 8:
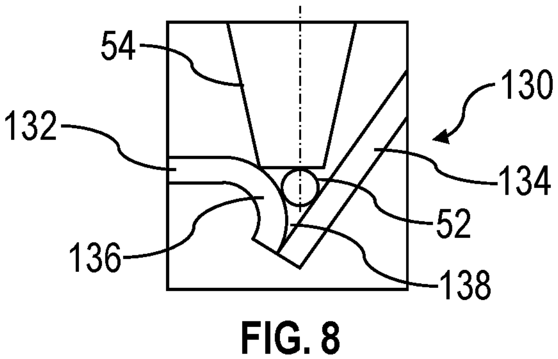
FIG. 8 is a schematic illustration of a workpiece joining example using the robotic system of FIG. 1 with positive offset, in accordance with various embodiments.
Figure 9:
FIG. 9 is a schematic view of a sensed image of the example of FIG. 8 using the alignment tool of FIG. 1

Referring to FIG. 8, an example of another joining process 130 with an offset (from center) wire 52 is schematically illustrated. The joining process 130 includes joining two panels 132 and 134, which may be made of sheet metal. The panel 132 has a bend 136 and the panel 134 is flat presenting a seam 138. Because of the bend 136, the panel 132 is curved way from the panel 134 at the seam 138. In this embodiment, the specifications of the joining process 130 call for alignment of the beam 54 and the wire 52 with the wire 52 offset from center in the beam 54. Specifically, to fuse the material of the panels 132, 134 with that of the wire 52, the wire is offset in the beam 54 toward the panel 134. FIG. 9 illustrates the desired image 140 from the alignment check system 28 with the left area 88 equal larger than the right area 90. For the left area 88 and the right area 90 to fall within specifications, the numbers of pixels in each area that indicate significant light should be different.

The specifications for the joining process 130 may include tolerances to allow for some variation between the relative sizes of the left area 88 and the right area 90. For example, the desired feature parameter for the offset may be −28.00. A feature parameter within the tolerance range of −29.00 to −27.00 may be acceptable. A representative alignment check may result in 13232 pixels in the left area 88 and 7288 pixels in the right area 90 that indicate illumination with the left area 88 larger than the right area 90. This correlates to a feature parameter of −28.97, which is within the tolerance range of −29.00 to −27.00 indicating acceptable alignment of the beam 54 and the wire 52, with no adjustment necessary. Another representative alignment check may result in 10207 pixels in the left area 88 and 10107 pixels in the right area 90 that indicate illumination. This correlates to a feature parameter of −0.49, which is outside the process tolerance range of −29.00 to −27.00 indicating unacceptable alignment of the beam 54 and the wire 52, with adjustment being necessary.

Figure 10:
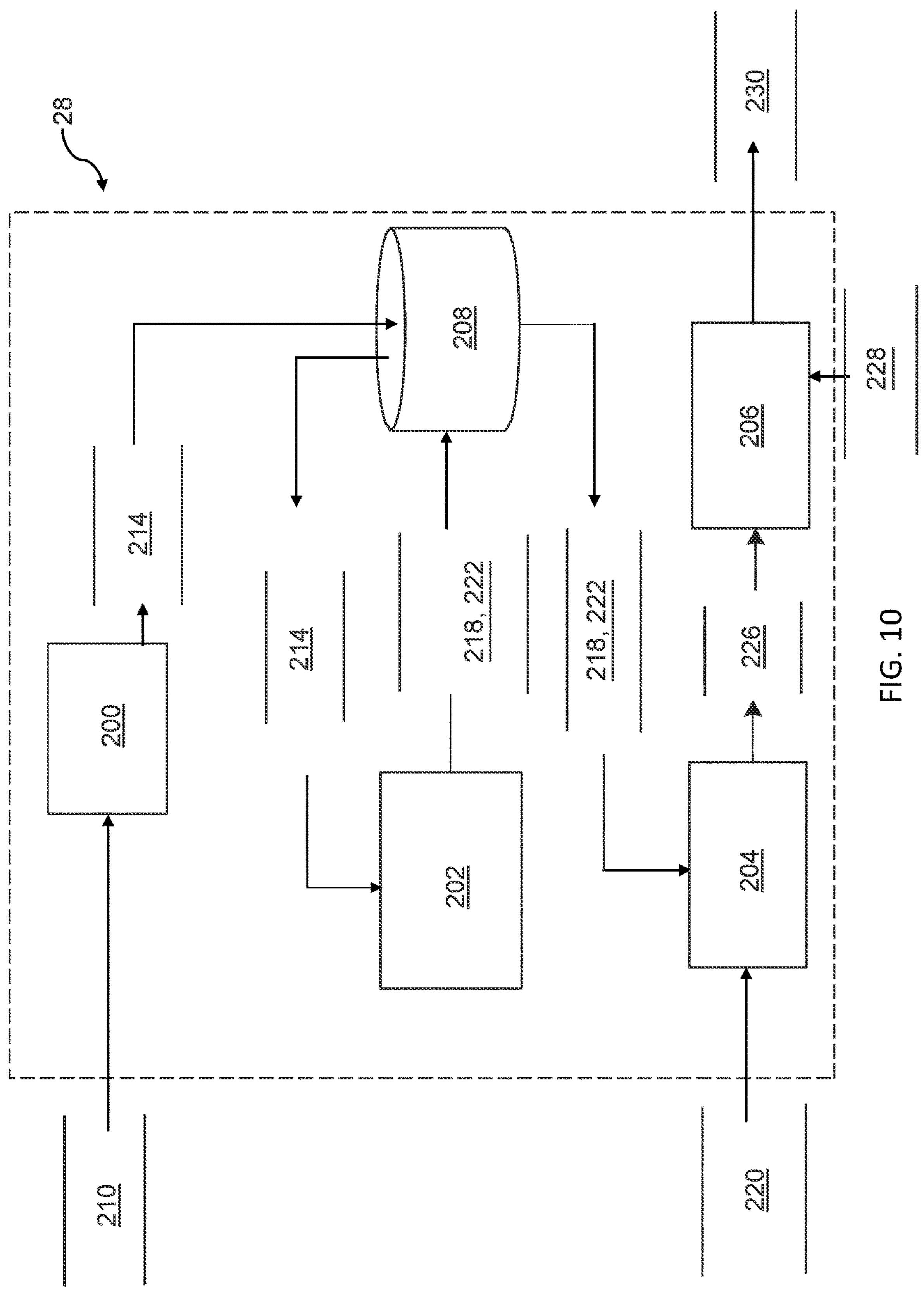
FIG. 10 is a dataflow diagram illustrating aspects of an alignment check system of FIG. 1, in accordance with various embodiments.

Referring to FIG. 10, elements of the alignment check system 28 for alignment of the wire 52 and the beam 54 are illustrated in dataflow diagram form in accordance with various embodiments. As will be appreciated, various embodiments of the alignment check system 28 according to the present disclosure may include any number of modules embedded within the controller 51 or in multiple controllers, which may be combined and/or further partitioned to implement the systems and methods described herein. Inputs to the alignment check system 28 may be received from various sensors of the system 20 including the sensor system 68, from other control modules (not shown) associated with the system 20, and/or determined by other sub-modules (not shown) within the controller 51. For simplicity, descriptions may refer to one controller 51, which means one or more controllers, including in the claims. The alignment check system 28 may be configured to include an area computation module 200, a feature parameter computation module 202, a beam alignment module 204, a system control module 206, and a datastore 208. The functions of the various modules may be carried out by the processor 53 in cooperation with the memory device 57 and the storage device 59, and/or with other devices.

In various embodiments, the area computation module 200 receives as input pixel data 210. The pixel data 210 may include data from the light detector 78 and may include data defining the intensity of the light at each pixel of the light detector 78. In other embodiments, the pixel data 210 may be data that corresponds to the type of light detector 78 employed. The area computation module 200 computes the size magnitude of the left area 88 and of the right area 90. For example, each of the pixels 94 in the left area 88 may have a known size and the computation may include multiplying the number of pixels in the left area 88 by the area of each individual pixel 94. In other embodiments, including those where the light detector 78 does not employ pixels, the areas may be computed by computing the area of the illuminated circular segment, such as by computing the area of the sector containing the illuminated segment and subtracting the area not illuminated in the shadow 70 using geometry and trigonometry. The area computation module 200 may access formula for computing area, such as from the datastore 208. The area data 214 includes the area $S_l$ and the area $S_r$. In making the computation, the processor 53 may count pixels that are carried in the pixel data 210 that have a light intensity magnitude above a threshold. For example, the pixel data 210 may include data on all pixels in the light detector 78 and those above the light intensity threshold may be included to define the left area 88 and the right area 90 while excluding the pixels in the shadow 70. The computed area data 214 is stored in the datastore 208.

In various embodiments, the feature parameter computation module 202 receives as input the area data 214, such as from the datastore 208. The feature parameter computation module 202 may access formula for computing feature parameters, such as from the datastore 208. Using the area data 214, the feature parameter computation module 202 may compute feature parameters using:

$$\lambda = 100 \times \frac{S_r - S_l}{S_r + S_l}.$$

The computed feature parameter data 218 is stored in the datastore 208.

Using the feature parameter data 218 and process specification data 220, the beam alignment module 204, determines whether the wire 52 and the beam 54 are properly aligned according to the process specification data 220. When the alignment falls outside the process specification data 220 as indicated by the feature parameter data 218, the beam alignment module 204 computes the amount of redirection of the beam 54 that is needed to fall within specifications. For example, the beam alignment module 204 may receive beam alignment data 222, such as from the datastore 208. The beam alignment data 222 may be determined by modelling, calculation and/or testing and may define adjustments to the direction of the beam 54 to index in steps related to the feature parameter A. The beam alignment module 204 defines the needed alignment adjustments in beam adjustment data 226.

In various embodiments, the system control module 206 receives as input the beam adjustment data 226 and system parameter data 228. The system parameter data 228 may be received from various modules of the controller 51 and defines the list of control actions that are available to the system control module 206 to vary the alignment of the beam 54 and the wire 52. For example, redirection of the beam 54 may be effected through the laser pointing actuator 60, and/or movement of the wire 52 may be effected through the actuator 64 of the wire guide 62. The beam adjustment data 226 may be organized, such as in a lookup table, and used to determine the adjustment needed to the beam 54 and/or the wire 52. The system control module 206 generates control data 230 that controls the system 20, such and by the laser pointing actuator 60, to align the wire 52 and the beam 54 according to the process specification data 220, such as described above with regard to FIGS. 6-9.

Figure 11:
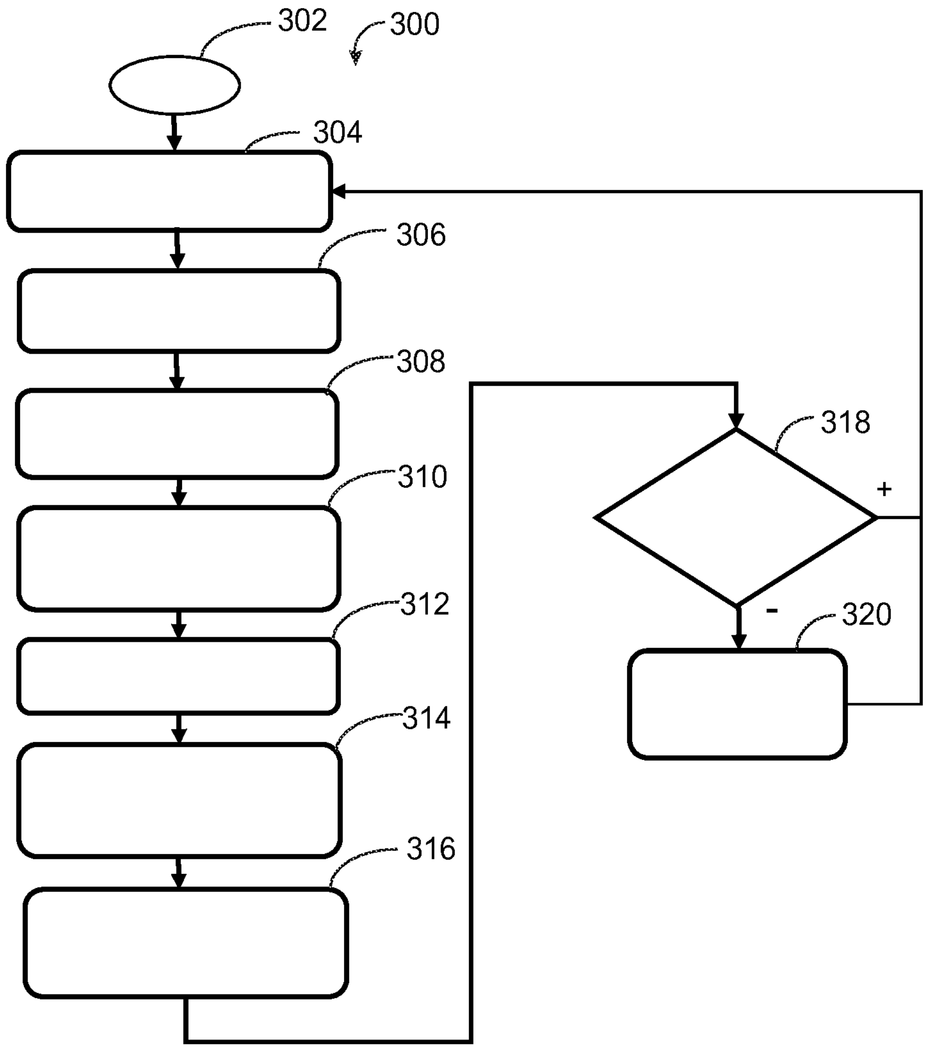
FIG. 11 is a flowchart of a method for aligning a laser beam with a filler wire using the system of FIG. 1, in accordance with various embodiments.

A method 300 for the use of the system 20, including to adjust alignment of the wire 52 to the beam 54, is illustrated in flowchart form in FIG. 11, to which reference is directed, along with FIGS. 1-10. As will be appreciated in light of the disclosure, the order of operation within the method 300 is not limited to the sequential execution as illustrated in FIG. 11, but may be performed in one or more varying orders as applicable and in accordance with the present disclosure. In various embodiments, the method 300 may be scheduled to run based on one or more predetermined events, and/or may run intermittently during operation of the system 20, such as on a time schedule.

The method 300 starts 302, such as when the robot 22 is in operation at the workstation 26 to join 304 the workpiece 42. When joining 304 the workpiece 42 the wire feed system 38 feeds the wire 52 and the laser joining system 24 operates the beam 54 in a high-energy state, such as via the control system 32. A wire 52/beam 54 alignment check is triggered 306, such as on a routine schedule. The triggering 306 may be based on a time based schedule, a schedule based on the number of workpieces 42 processed, or on a schedule based on other factors. In some embodiments, the triggering 306 may occur when the system 20 is being set up and initial alignment of the wire 52 and the beam 54 is being effected. In other embodiments, a different device may be used for initial setup and alignment.

When an alignment check is triggered 306, the robot 22, under operation of the controller 51, moves 308 the end-of-arm tooling 34 to the alignment check cell 55. The beam 54 is generated 310 by the laser system 36 in a pilot beam (low-energy) state, as opposed to the welding/brazing strength beam. The beam 54 is directed into the sensor system 68, such as normal to the lens 74 as described above. The wire 52 is positioned by the wire feed system 38/wire guide 62 as it is positioned during the workpiece joining 304. This directs light in the form of the beam 54 at the sensor system 68 with the wire 52 casting the shadow 70 on the sensor system 68. For purposes of the alignment check, the beam 54 may be generated for a pulse of a short duration, such as a fraction of a second, to capture the needed data.

As the method 300 continues, the light reaching the light detector 78 is measured 312. For example, when the camera 72 is employed, light intensity per pixel is measured and stored, such as in the storage device 59. The sizes of the illuminated areas $S_l$ and $S_r$ are computed 314, such as by the area computation module 200. Using the computed 314 areas $S_l$ and $S_r$, the feature parameter is computed 316, such as by the feature parameter computation module 202 using $$\lambda = 100 \times \frac{S_r - S_l}{S_r + S_l}.$$

The method 300 continues with determining 318 whether the computed 316 feature parameter is within the specified tolerance range of the process specifications. To achieve desired weld quality for the joint 50, the beam 54 and wire 52 alignment defined by the process is desirably maintained. The feature parameter of the specification is defined for the desired alignment value, which may be with the wire 52 centered in the beam 54, or which may have an offset of the wire 52 from center. When the determination 318 is positive, meaning the feature parameter is within the specified tolerance range, the method 300 returns to joining 304 the workpiece 42 and the robot 22 moves the end-of-arm tooling 34 to the workstation 26. The system 20 proceeds to form the joint 50.

When the determination 318 is negative, meaning the feature parameter is not within the specified tolerance range, the method 300 proceeds to adjust 320 the alignment between the beam 54 and the wire 52. For example, via the beam alignment module 204, the adjustment increment may be determined. In addition, such as via the system control module 206, the laser pointing actuator 60 (beam targeting adjustment), and/or the actuator 64 of the wire guide 62 are operated using the adjustment increment to align the wire 52 and the beam 54 to within the tolerance range, and to the process specification's alignment setting. When the alignment is adjusted 320, the method 300 returns to joining 304 the workpiece 42. In embodiments, the method 300 may first return to generating 310 the pilot beam and may proceed therefrom to verify the adjustment is accurate before returning to the joining 304 step.

Through the foregoing embodiments, light detection is used to determined whether the filler wire and the laser beam of a laser joining system are aligned according to process specifications. When the level of alignment is out-of-specification, the alignment may be automatically adjusted.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A system for checking alignment of a wire relative to a beam of a laser, the system comprising:

an alignment cell including a sensor system that detects light; and a controller configured to:

move, by tooling, the laser accompanied by the wire to the alignment cell;

align, by the tooling, the beam with the sensor system;

generate, by a laser, the beam across the wire and directed to the sensor system so that the beam casts a shadow of the wire on the sensor system;

measure, by the sensor system, light intensities, including a light intensity of the shadow cast by the wire, a light intensity of the beam on a first side of the shadow, and a light intensity of the beam on a second side of the shadow;

determine, from the light intensities, a first area of the beam on a first side of the shadow and a second area of the beam on a second side of the shadow;

compute, by a processor, a feature parameter representative of an alignment between the wire and the beam as a function of the first area and the second area; and determine, by the processor, whether the feature parameter is within process specifications.

2. The system of claim 1, wherein the laser is configured to generate the beam via a beam delivery system to a welding location for welding a workpiece, wherein the beam delivery system effects the generating the beam across the wire and directed to the sensor system, so that the beam shows the welding location consistent with the delivery for the welding the workpiece.

3. The system of claim 1, wherein, prior to computing the feature parameter, the controller is configured to compute, by the processor, the first area of the beam and the second area of the beam.

4. The system of claim 3, comprising an actuator responsive to the controller, wherein the controller is further configured to position, via the actuator, the wire in an offset from center in the beam location for processing a workpiece according to an offset specification.

5. The system of claim 1, wherein the feature parameter is computed using $$\lambda = 100 \times \frac{S_r - S_l}{S_r + S_l},$$

where λ is the feature parameter, $S_l$ is the first area, and $S_r$ is the second area.

6. The system of claim 1, wherein a filter is disposed between the laser and the sensor system, wherein the filter is configured to filter background light while allowing the beam to pass to the sensor system.

7. The system of claim 1, wherein the sensor system includes an optical lens and wherein the beam is aligned with the lens by the tooling to calibrate the image.

8. The system of claim 1, wherein the sensor system includes a camera that is configured to generate pixel data representing light intensities of the beam and of a shadow cast by the wire.

9. The system of claim 1, wherein the controller is configured to generate the beam in a low-energy mode when the beam is directed to the sensor system.

10. The system of claim 1, wherein the determining, by the processor, whether the feature parameter is within process specifications includes determining, when the process specifications include centering the wire in the beam, whether the feature parameter is approximately zero.

11. A method for checking alignment of a wire relative to a beam of a laser, the method comprising:

- providing an alignment cell including a sensor system that detects light;
- moving, by tooling, the laser accompanied by the wire to the alignment cell;
- aligning, by tooling operated by a controller, the beam with the sensor system;
- generating, by a laser operated by the controller, the beam across the wire and directed to the sensor system so that the beam casts a shadow of the wire on the sensor system;
- measuring, by the sensor system, light intensities, including a light intensity of the shadow cast by the wire, a light intensity of the beam on a first side of the shadow, and a light intensity of the beam on a second side of the shadow;
- determining, from the light intensities, a first area of the beam on a first side of the shadow and a second area of the beam on a second side of the shadow;
- computing, by a processor, a feature parameter representative of an alignment between the wire and the beam as a function of the first area and the second area; and
- determining, by the processor, whether the feature parameter is within process specifications.

12. The method of claim 11, comprising:

- generating, by the laser, the beam via a beam delivery system to a welding location for welding a workpiece;
- generating by the beam delivery system, the beam across the wire and directed to the sensor system, so that the beam shows the welding location consistent with the delivery for the welding the workpiece.

13. The method of claim 11, comprising, prior to computing the feature parameter, computing, by the processor, the first area and the second area.

14. The method of claim 13, comprising positioning, via an actuator responsive to the controller, the wire in an offset from center in the beam location for processing a workpiece according to an offset specification.

15. The method of claim 11, comprising computing the feature parameter using $$\lambda = 100 \times \frac{S_r - S_l}{S_r + S_l},$$

where λ is the feature parameter, $S_l$ is the first area, and $S_r$ is the second area.

16. The method of claim 11, comprising:

- positioning a filter disposed between the laser and the sensor system; and
- filtering, by the filter background light while allowing the beam to pass to the sensor system.

17. The method of claim 11, comprising:

- including an optical lens in the sensor system; and
- aligning, by the tooling, the beam with the lens to calibrate the image.

18. The method of claim 11, comprising generating, by a camera of the sensor system, pixel data representing light intensities of the beam and of a shadow cast by the wire.

19. The method of claim 11, comprising determining, when the process specifications include centering the wire in the beam, whether the feature parameter is approximately zero.

20. A system for checking alignment of a wire relative to a beam of a laser, the system comprising:

- an alignment cell including a sensor system that detects light; and
- a controller configured to:
- move, by tooling, the laser accompanied by the wire to the alignment cell;
- align, by the tooling, the beam with the sensor system;
- generate, by a laser, the beam across the wire and directed to the sensor system so that the beam casts a shadow of the wire on the sensor system;
- measure, by the sensor system, light intensities, including a light intensity of the shadow cast by the wire, a light intensity of the beam on a first side of the shadow, and a light intensity of the beam on a second side of the shadow;
- determine, from the light intensities, a first area of the beam on a first side of the shadow and a second area of the beam on a second side of the shadow;
- compute, by a processor, a first area of the beam on a first side of the beam;

compute, by the processor, a second area of the beam on a second side of the beam;

- compute, by the processor, a feature parameter representative of an alignment between the wire and the beam as a function of the first area and the second area;

determine, by the processor, whether the feature parameter is within process specifications; and align, by an actuator and when the feature parameter is not within the process specifications, the beam with the wire.

* * * * *